United States Patent
Kim et al.

(10) Patent No.: US 11,570,013 B2
(45) Date of Patent: Jan. 31, 2023

(54) METHOD AND APPARATUS FOR PROVIDING CHAT SERVICE

(71) Applicant: NCSOFT Corporation, Seoul (KR)

(72) Inventors: Hyun Ho Kim, Seongnam-si (KR); Seung Jae Song, Seongnam-si (KR); Seung Bo Sim, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 17/182,789

(22) Filed: Feb. 23, 2021

(65) Prior Publication Data

US 2021/0297274 A1  Sep. 23, 2021

(30) Foreign Application Priority Data

Mar. 18, 2020 (KR) .................. 10-2020-0032971

(51) Int. Cl.
*H04L 12/18* (2006.01)
*H04L 51/046* (2022.01)
*A63F 13/87* (2014.01)

(52) U.S. Cl.
CPC .......... *H04L 12/1822* (2013.01); *A63F 13/87* (2014.09); *H04L 12/1818* (2013.01); *H04L 51/046* (2013.01)

(58) Field of Classification Search
CPC ............ H04L 12/1822; H04L 12/1818; H04L 51/046; A63F 13/87
USPC ....................................................... 709/204
See application file for complete search history.

(56) References Cited

U.S. PATENT DOCUMENTS

| | | | |
|---|---|---|---|
| 2005/0181878 A1* | 8/2005 | Danieli | A63F 13/12 463/42 |
| 2007/0198647 A1 | 8/2007 | Lingafelt et al. | |
| 2009/0276529 A1 | 11/2009 | Ivory et al. | |
| 2013/0332870 A1 | 12/2013 | Kim et al. | |
| 2014/0143028 A1* | 5/2014 | Howe | G06Q 50/01 705/12 |
| 2015/0026604 A1 | 1/2015 | Mulukuri et al. | |
| 2016/0001187 A1* | 1/2016 | Sepulveda | A63F 13/77 463/31 |
| 2017/0291111 A1* | 10/2017 | Chandrasekaran | A63F 13/87 |

(Continued)

FOREIGN PATENT DOCUMENTS

| CN | 1889722 A | 1/2007 |
|---|---|---|
| CN | 103281237 A | 9/2013 |

(Continued)

OTHER PUBLICATIONS

Communication dated Jan. 29, 2021, in corresponding Taiwanese Patent Application No. 109121796, 4 pages.

(Continued)

*Primary Examiner* — James E Springer
(74) *Attorney, Agent, or Firm* — Sughrue Mion, PLLC

(57) ABSTRACT

A method and apparatus for providing a chat service are provided. The method for providing a chat service according to one embodiment includes providing an invitation target list including a plurality of user groups to a user device of a user participating in a chat room, receiving, from the user device, an invitation request for one or more user groups selected as invitation target user group from among the plurality of user groups, and inviting the invitation target user group to the chat room.

19 Claims, 14 Drawing Sheets

(56) References Cited

U.S. PATENT DOCUMENTS

| | | | | |
|---|---|---|---|---|
| 2018/0027068 A1* | 1/2018 | Kumar | ............... | H04L 67/1044 |
| | | | | 709/206 |
| 2020/0196111 A1* | 6/2020 | Yang | ................... | H04L 67/1044 |
| 2020/0228610 A1* | 7/2020 | Fisher | .................. | A63F 13/493 |

FOREIGN PATENT DOCUMENTS

| | | |
|---|---|---|
| CN | 106657613 A | 5/2017 |
| CN | 109683728 A | 4/2019 |
| CN | 110233742 A | 9/2019 |
| JP | 2018-139115 A | 9/2018 |
| KR | 10-2014-0015690 A | 2/2014 |
| KR | 10-2014-0041757 A | 4/2014 |
| KR | 10-2016-0091861 A | 8/2016 |
| KR | 10-2018-0039547 A | 4/2018 |

OTHER PUBLICATIONS

Line "Pick the Day" Feature, which determines the date of the event and attendance, does not need to ask one by one when it is available, Mar. 4, 2017, 15 pages.

Communication dated Sep. 30, 2021 from the Taiwanese Patent Office in Taiwanese Application No. 109121796.

Communication dated Oct. 22, 2021 from the Korean Patent Office in Korean Application No. 10-2020-0032971.

Communication dated Aug. 24, 2021 from the Japanese Patent Office in Japanese Application No. 2020-115314.

Office Action dated Dec. 21, 2021 in Japanese Application No. 2020-115314.

Office Action dated Oct. 10, 2022 issued by the Chinese Patent Office in Chinese Application No. 202010661233.1.

\* cited by examiner

METHOD AND APPARATUS FOR PROVIDING CHAT SERVICE

CROSS-REFERENCE TO RELATED APPLICATION (S)

This application claims the benefit under 35 USC § 119(a) of Korean Patent Application No. 10-2020-0032971, filed on Mar. 18, 2020, in the Korean Intellectual Property Office, the entire disclosure of which is incorporated herein by reference for all purposes.

BACKGROUND

1. Field

The following description relates to technology for providing a chat service.

2. Description of Related Art

In the case of a conventional chat service that supports chat between participants in a chat room, such as a messenger service, in order to invite another user to the chat room, a user to be is invited must be individually selected and invited. Hence, when a large number of users belonging to a specific group are to be invited, there is an inconvenience in that an invitation procedure must be individually performed for each of a plurality of users belonging to the specific group.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a method and apparatus for providing a chat service.

In one general aspect, there is provided a method for providing a chat service including providing an invitation target list including a plurality of user groups to a user device of a user participating in a chat room, receiving, from the user device, an invitation request for one or more user groups each selected as an invitation target user group from among the plurality of user groups, and inviting the invitation target user group to the chat room.

The plurality of user groups may include at least one of a user group of a chat service in which the chat room is created and a user group of an associated service of the chat service, the user group of the chat service may include at least one of other chat rooms created in the chat and user groups pre-registered by the user in the chat service, and the associated service may include an online game service.

The inviting may include providing an invitation message for an invitation to the chat room to a user device of at least one of one or more users included in the invitation target user is group and adding the at least one of the one or more users included in the invitation target user group as a participant in the chat room according to whether the user who has received the message for an invitation accepts the invitation.

The providing of the invitation message may include providing the invitation message to a user device of a representative of the invitation target user group and the adding may include, when the representative accepts the invitation to the chat room, adding all users included in the invitation target user group as participants in the chat room.

The providing of the invitation message may include providing the invitation message to a user device of a user who is randomly selected from among one or more users included in the invitation target user group or who is selected by a user who has requested an invitation for the invitation target user group and the adding may include, when the selected user accepts the invitation to the chat room, adding all users included in the invitation target user group as participants in the chat room.

The transmitting of the invitation message may include providing the invitation message to a user device of each of the one or more users included in the invitation target user group and the adding may include adding a user who accepts the invitation to the chat room among the one or more users included in the invitation target user group as the participant in the chat room.

The method may further include, when a new user is added to the invitation target user group after the adding of the at least one of the one or more users, providing an invitation message for an invitation to the chat room to a user device of the new user, and when the new user accepts the invitation to the chat room, adding the new user as a participant in the chat room.

The method may further include, when, among the one or more users included in the invitation target user group, a user added as the participant in the chat room leaves the invitation target user group, performing exit processing to cause the leaving user to exit the chat room.

The performing of the exit processing may include, when the leaving user is a representative of the invitation target user group, performing exit processing to cause all users included in the invitation target user group among the one or more users participating in the chat room to exit the chat room.

The method may further include, when a representative of the invitation target user group exits the chat room after being added as a participant in the chat room, performing exit processing to cause all users included in the invitation target user group among the remaining users participating in the chat room to exit the chat room.

In another general aspect, there is provided an apparatus for providing a chat service including one or more processors and one or more communication interfaces, wherein the one or more processors are configured to provide, through the one or more interfaces, an invitation target list including a plurality of user groups to a user device of a user participating in a chat room, receive, through the one or more interfaces, an invitation request for one or more user groups each selected as an invitation target user group from among the plurality of user groups from the user device, and invite the invitation target user group to the chat room.

The plurality of user groups may include at least one of a user group of a chat service in which the chat room is created and a user group of an associated service of the chat service, the user group of the chat service may include at least one of other chat rooms created in the chat service and user groups pre-registered by the user in the chat service, and the associated service may include an online game service.

The one or more processors may provide an invitation message for an invitation to the chat room to a user device of at least one of one or more users included in the invitation target user group and add the at least one of the one or more users included in the invitation target user group as a participant in the chat room according to whether the user who has received the is message for an invitation accepts the invitation.

The one or more processors may provide the invitation message to a user device of a representative of the invitation target user group and, when the representative accepts the invitation to the chat room, add all users included in the invitation target user group as participants in the chat room.

The one or more processors may provide the invitation message to a user device of a user who is randomly selected from among one or more users included in the invitation target user group or who is selected by a user who has requested an invitation for the invitation target user group and, when the selected user accepts the invitation to the chat room, add all users included in the invitation target user group as participants in the chat room.

The one or more processors may provide the invitation message to a user device of each of the one or more users included in the invitation target user group and add a user who accepts the invitation to the chat room among the one or more users included in the invitation target user group as the participant in the chat room.

When a new user is added to the invitation target user group after adding the at least one of the one or more users included in the invitation target user group as the participant in the chat room, the one or more processors may provide an invitation message for an invitation to the chat room to a user device of the new user and, when the new user accepts the invitation to the chat room, add the new user as a participant in the chat room.

When among the one or more users included in the invitation target user group, a user added as the participant in the chat room leaves the invitation target user group, the one or more processors may perform exit processing to cause the leaving user to exit the chat room.

When the leaving user is a representative of the invitation target user group, the one or more processors may perform exit processing to cause all users included in the invitation target user group among the one or more users participating in the chat room to exit the chat room.

When a representative of the invitation target user group exits the chat room after being added as a participant in the chat room, the one or more processors may perform exit processing to cause all users included in the invitation target user group among the remaining users participating in the chat room to exit the chat room.

Other features and aspects will be apparent from the following detailed description, the drawings, and the claims.

Figure 1:
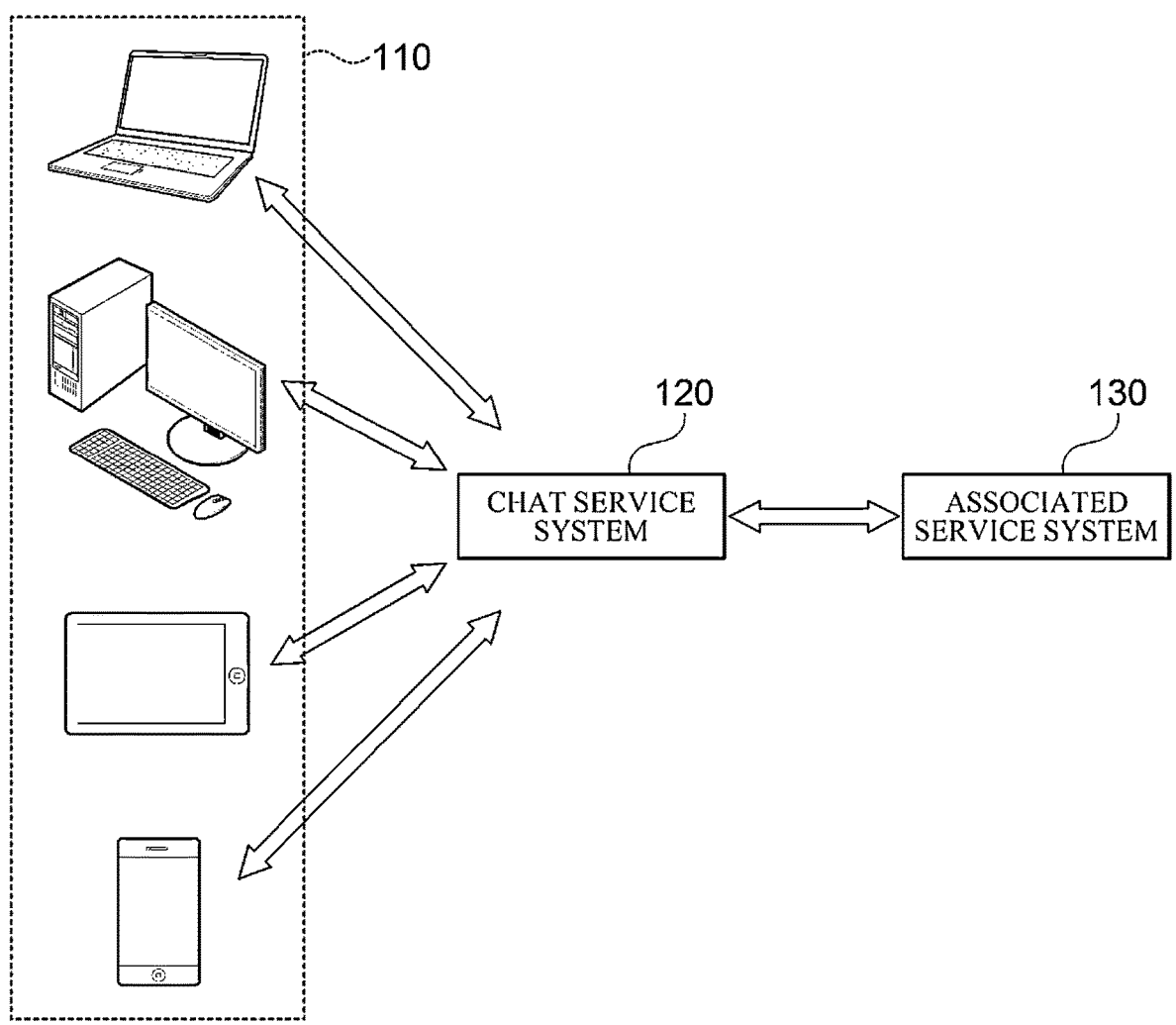
FIG. 1 is a diagram illustrating a network environment for providing a chat service according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a network environment for providing a chat service according to one embodiment.

Referring to FIG. 1, a network environment for providing a chat service according to one embodiment includes a plurality of user devices 110, a chat service system 120, and an associated service system 130.

Each of the plurality of user devices 110 is used to receive a chat service from the chat service system 120.

In one embodiment, each of the plurality of user devices 110 may be used by a different user, but is not limited thereto, and two or more of the plurality of user devices 110 may be used is by the same user.

According to one embodiment, a user application for providing a chat service to a user in cooperation with the chat service system 120 may be installed on each user device 110. Specifically, the user of the chat service may access the chat service system 120 by executing the user application installed on his/her user device, and then use the chat service provided by the chat service system 120 through an execution screen of the user application.

Meanwhile, the plurality of user devices 110 may include, for example, a desktop personal computer (PC), a laptop PC, a tablet PC, a smartphone, a phablet, a smart TV, and the like. However, in addition to the above-described examples, the plurality of user devices 110 may be various types of devices including communication means for data communication using a wired/wireless network, data processing means for data processing and calculation, storage means for data storage, input/output means, and the like.

The chat service system 120 may be provided to provide a chat service to the user by cooperating with the user application installed on each of the plurality of user devices 110 and may be configured with one or more servers.

In one embodiment, the chat service refers to a service that enables the user to join a chat room and have a chat with one or more other users participating in the chat room. In this case, the chat room may refer to a virtual space created to exchange text messages, voice messages, images, videos, and the like between users participating in the chat room. For example, each user may access the chat service system 120 through the user application installed on his/her user device and then join the chat room by creating a new chat room or being invited to a chat room created by another user.

Meanwhile, hereinafter, a user participating in a chat room will be referred to as a "participant."

The associated service system 130 may be provided to provide an associated service linked to a chat service, and may be configured with one or more servers.

According to one embodiment, when the chat service is linked to the connection service, it may mean that a user account of a user registered in the associated service can be accessed using a user account of the corresponding user registered in the chat room, or that the chat service and the associated service are provided using one integrated user account.

Meanwhile, according to one embodiment, the associated service may be, for example, an online game service, and may include, in addition to the online game service, various types of services that are used by a plurality of users online and allow the users of the services to be classified into one or more groups or allow the users to generate groups for use of the services.

Figure 2:
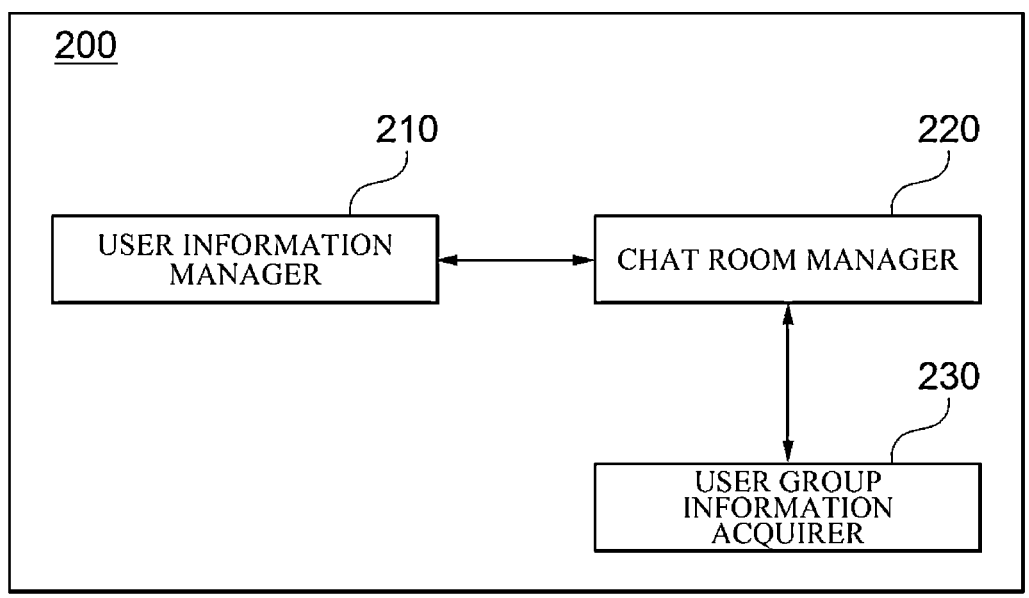
FIG. 2 is a diagram illustrating a configuration of an apparatus for providing a chat service according to one embodiment.

FIG. 2 is a diagram illustrating a configuration of an apparatus for providing a chat service according to one embodiment.

Referring to FIG. 2, the apparatus 200 for providing a chat service according to one embodiment includes a user information manager 210, a chat room manager 220, and a user group information acquirer 230.

According to one embodiment, the apparatus 200 for providing a chat service may be implemented as one configuration included in the chat service system 120 illustrated in FIG. 1.

In addition, according to one embodiment, the user information manager 210, the chat room manager 220, and the user group information acquirer 230 may each be implemented using one or more physically separated devices, one or more processors, or a combination of one or more processors and software, and may not be clearly distinguished in a specific operation unlike the illustrated example.

The user information manager 210 manages user information of each user who uses the chat service.

According to one embodiment, the user information may include at least one of user profile information (e.g., user ID, a display name, a profile image, and the like), chat room participation information, and friend information.

In this case, the chat room participation information may include information related to the chat room that the user is participating in among chat rooms created in the chat service. For example, the chat room participation information may include a name, an identification code, and the like of the chat room that the user is participating in.

The friend information may include information related to other users registered as friends by the user in the chat service. For example, the friend information may include profile information (e.g., user ID, a display name, a profile image, and the like) of another user registered as a friend by the user, a nickname given to a friend by the user, and the like.

The chat room manager 220 performs procedures for creating a chat room, inviting to a chat room, and leaving the chat room in cooperation with the user application, and manages a variety of information related to the created chat room.

According to one embodiment, the chat room manager 220 may create a chat room in response to a request for creating a chat room from a user accessing the chat service through the user application.

Specifically, the user of the chat service may access his/her user account registered in the chat service by executing the user application installed on his/her user device and then request the apparatus 200 for providing a chat service to create a chat room. At this time, according to one embodiment, the user may input chat room setting information through an interface screen provided by the user application for creating the chat room, and when the chat room setting information is input, the user application may transmit the request for creating a chat room is including the input chat room setting information to the apparatus 200 for providing a chat service. In this case, the chat room manager 220 may create the chat room on the basis of the chat room setting information included in the request for creating a chat room.

Meanwhile, the chat room setting information may include information regarding, for example, the name of the chat room, a representative image of the chat room, a chat room type, invitation authority of a chat room participant, and the like, but may include, other than the above-described examples, a variety of information that can be set by the user according an embodiment.

Meanwhile, according to one embodiment, the chat room manager 220 may invite one or more user groups to the chat room according to an invitation request of a participant in the chat room.

At this time, the participant who has requested the invitation may be a participant to invite another user who has not participated in the chat room. For example, the participant who has invitation authority may be a creator of the chat room, a host of the chat room, a participant to whom invitation authority is delegated by another participant who has the invitation authority, or the like, but all participants in the chat room may have invitation authority according to an embodiment.

According to one embodiment, the user group may include at least one of a user group of the chat service and a user group of the associated service.

Specifically, according to one embodiment, the user group of the chat service may include at least one of other chat rooms created in the chat service and a user group pre-registered in the chat service by the participant who has requested an invitation.

In this case, according to one embodiment, the other chat rooms created in the chat service may include other chat rooms in which an inviter is not participating, as well as the chat rooms in which the inviter is participating.

In addition, according to one embodiment, the user group pre-registered in the chat service by the participant who has requested an invitation may be set by, for example, classifying other users who are registered in the chat service as friends of the participant who has requested the invitation according to criteria set by the participant and registering a classified group as account information of a user account of the participant.

According to one embodiment, the user group of the associated service may include a user group registered in the associated service. For example, when the associated service is an online game service, the user group of the associated service may include a group consisting of alliances of users in the online game service, such as a blood alliance, a clan, a guild, and the like. However, the user group of the associated service may have various forms according to the type of the associated service, the form of the service, and the like.

In addition, according to one embodiment, the user group of the associated service may include a user group that includes the participant who has requested the invitation, as well as a user group that does not include the participant who has requested the invitation.

According to one embodiment, the chat room manager 220 manages chat room information regarding each chat room created in the chat service. For example, the chat room information may include chat room identification information (e.g., a name of a chat room, a chat room identification code, and the like), chat room type information (e.g., secret chat room, open chat room, and the like), participant information, and the like. Here, the participant information may include, for example, user identification information of the chat room participant (e.g., user ID, a display name, and the like), information on a status of a participant in is a chat room (e.g., a chat room creator, a host, or the like), and information on invitation authority of a chat room participant. Meanwhile, the chat room information managed by the chat room manager 220 may not be necessarily limited to the above-described examples, and may include a variety of information other than the above examples according to an embodiment.

The user group information acquirer 230 acquires user group information related to a user group of the associated service from the associated service system 130.

According to an embodiment, the user group information may include, for example, identification information of the user group of the associated service (e.g., a name and an identification code of a user group, and the like), a representative image, member information, and the like. In this case, the member information may include, for example, information on a representative of a user group, identification information (e.g., user ID, a display name, and the like) for identifying members of a user group of an associated service among the users of the chat service.

Figure 3:
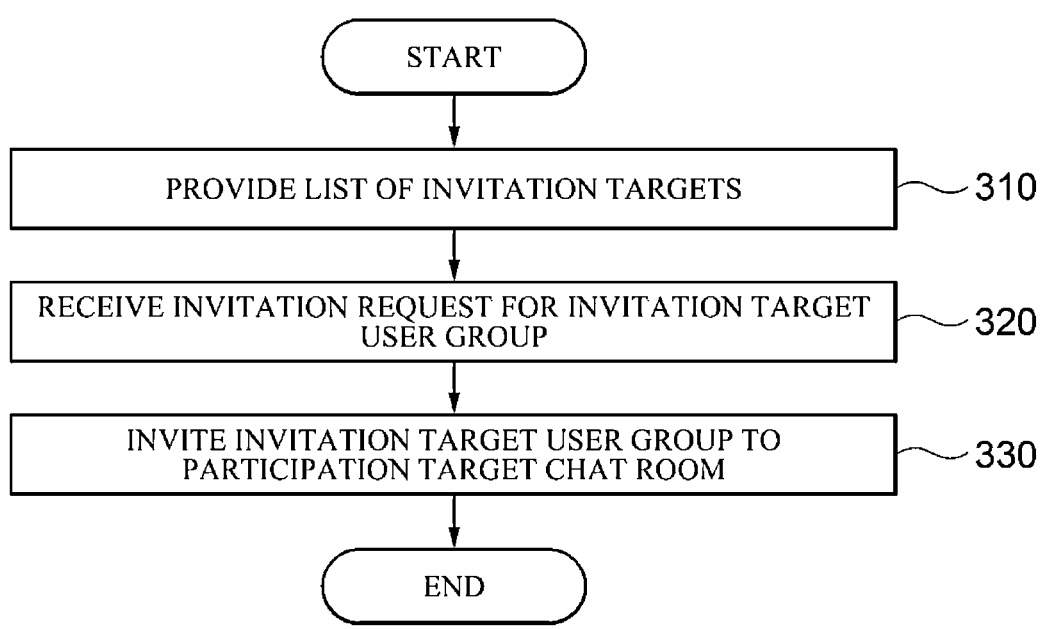
FIG. 3 is a flowchart illustrating procedures for inviting a user group to a chat room according to one embodiment.

FIG. 3 is a flowchart illustrating procedures for inviting a user group to a chat room according to one embodiment.

Referring to FIG. 3, the apparatus 200 for providing a chat service provides a list of invitation targets including one or more user groups to a user device of a participant who participates in a chat room (hereinafter referred to as a "participation target chat room") (310).

According to one embodiment, the apparatus 200 for providing a chat service may provide the list of invitation targets to a user device of a participant who has requested invitation target information among one or more participants participating in the participation target chat room. In this case, according to one embodiment, the participant who has requested the invitation target information may be a participant who has invitation authority to invite another user who has not participated in the chat room to the chat room. For example, the participant is who has invitation authority may be a creator of the chat room, a host of the chat room, a participant to whom invitation authority is delegated by another participant who has the invitation authority, or the like, but all participants in the chat room may have invitation authority according to an embodiment.

Meanwhile, according to an embodiment, the user group included in list of invitation targets may include at least one of a user group of the chat service and a user group of an associated service.

Specifically, according to one embodiment, the user group of the chat service may include at least one of other chat rooms created in the chat service and a user group pre-registered in the chat service by a participant who has requested the invitation target information. In this case, the other chat rooms created in the chat service may include, for example, a chat room in which the participant who has requested the invitation target information is participating. In another example, the other chat rooms created in the chat service may include a chat room searched from among chat rooms in which the participant who has requested the invitation target information is not participating, on the basis of a search keyword provided by the participant who has requested the invitation target information.

Meanwhile, according to one embodiment, the user group of the associated service may include, for example, a user group registered in the associated service. In this case, the user group registered in the associated service may include, for example, a user group to which the participant who has requested the invitation target information is belonging. In another example, the user group registered in the associated service may include a user group searched from among user groups to which the participant who has requested the invitation target information is not belonging, on the basis of a search keyword provided by the participant who has requested the invitation target information.

After providing the list of invitation targets, the apparatus 200 for providing a chat service receives, from the user device of the participant who has received the list of invitation targets, an invitation request for one or more user groups (hereinafter referred to as "invitation target user group") selected from among one or more user groups included in the list of the invitation targets by the participant (320).

In this case, according to one embodiment, the invitation request for the invitation target user group may user group identification information for identifying the user group which is selected as the invitation target user group from among one or more user groups included in the list of invitation targets by the participant. In this case, the user group identification information may be, for example, a name, an identification code, and the like of the invitation target user group, but is not necessarily limited to specific information as long as it can be used by the apparatus 200 for providing a chat service to identify the invitation target user group among the user groups included in the list of invitation targets.

Meanwhile, when the invitation request for the invitation target user group is received, the apparatus 200 for providing a chat service invites the invitation target user group to the participation target chat room (330).

According to one embodiment, the apparatus 200 for providing a chat service may provide an invitation message for an invitation to the participation target chat room to at least one user device of a user among one or more users belonging to the invitation target user group. In addition, the apparatus 200 for providing a chat service may add at least one of the users belonging to the invitation target user group as a participant in the participation target chat room on the basis of whether the user who has received the invitation message accepts the invitation.

Meanwhile, in the flowchart illustrated in FIG. 3, at least some of the operations may be performed in different order or may be combined into fewer operations or further divided into is more operations. In addition, some of the operations may be omitted, or one or more extra operations, which are not illustrated, may be added to the flowchart and be performed.

Figure 4:
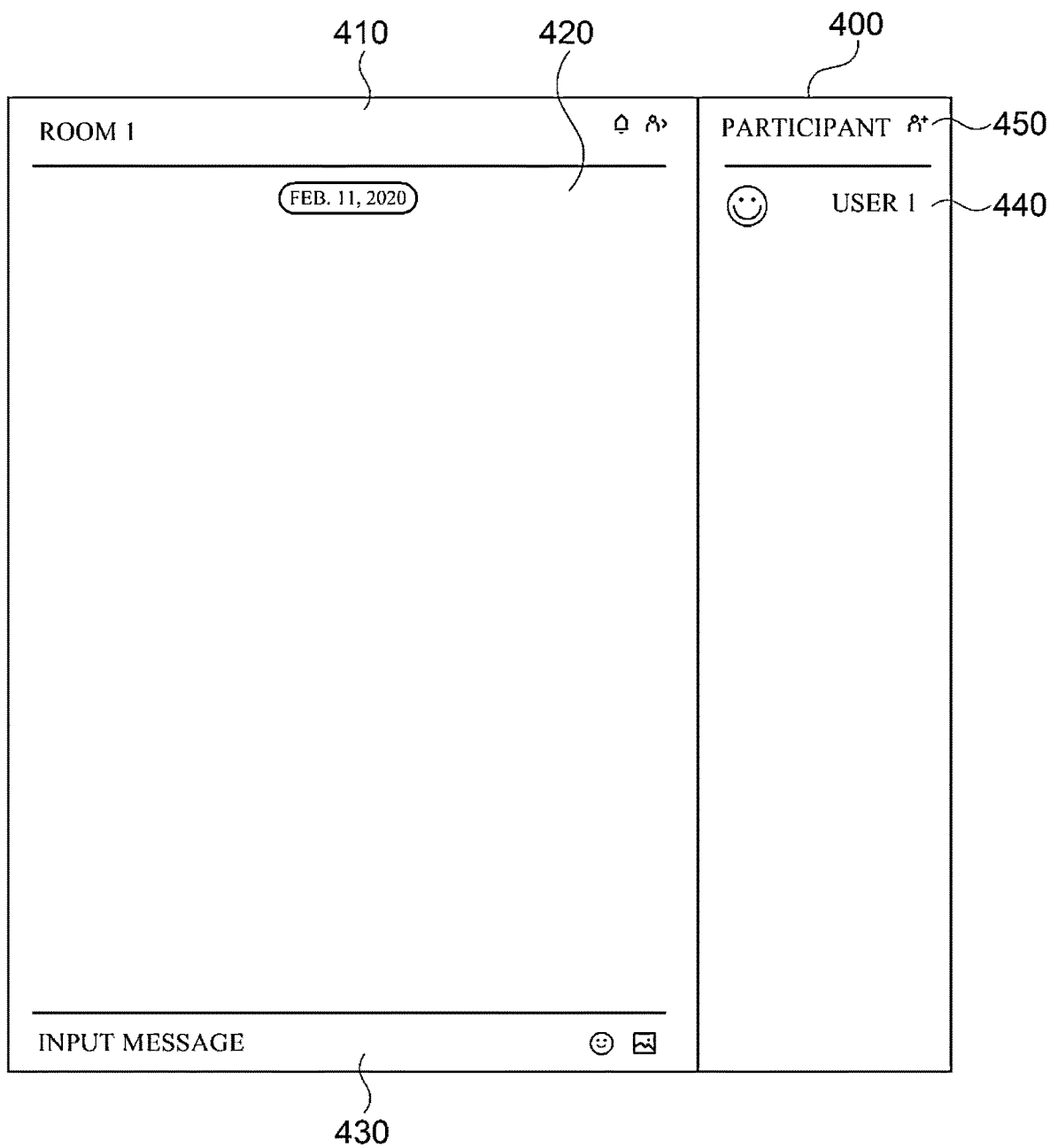
FIG. 4 is a diagram illustrating an example of a basic interface screen of a chat room provided by a service application according to one embodiment.
Figure 5:
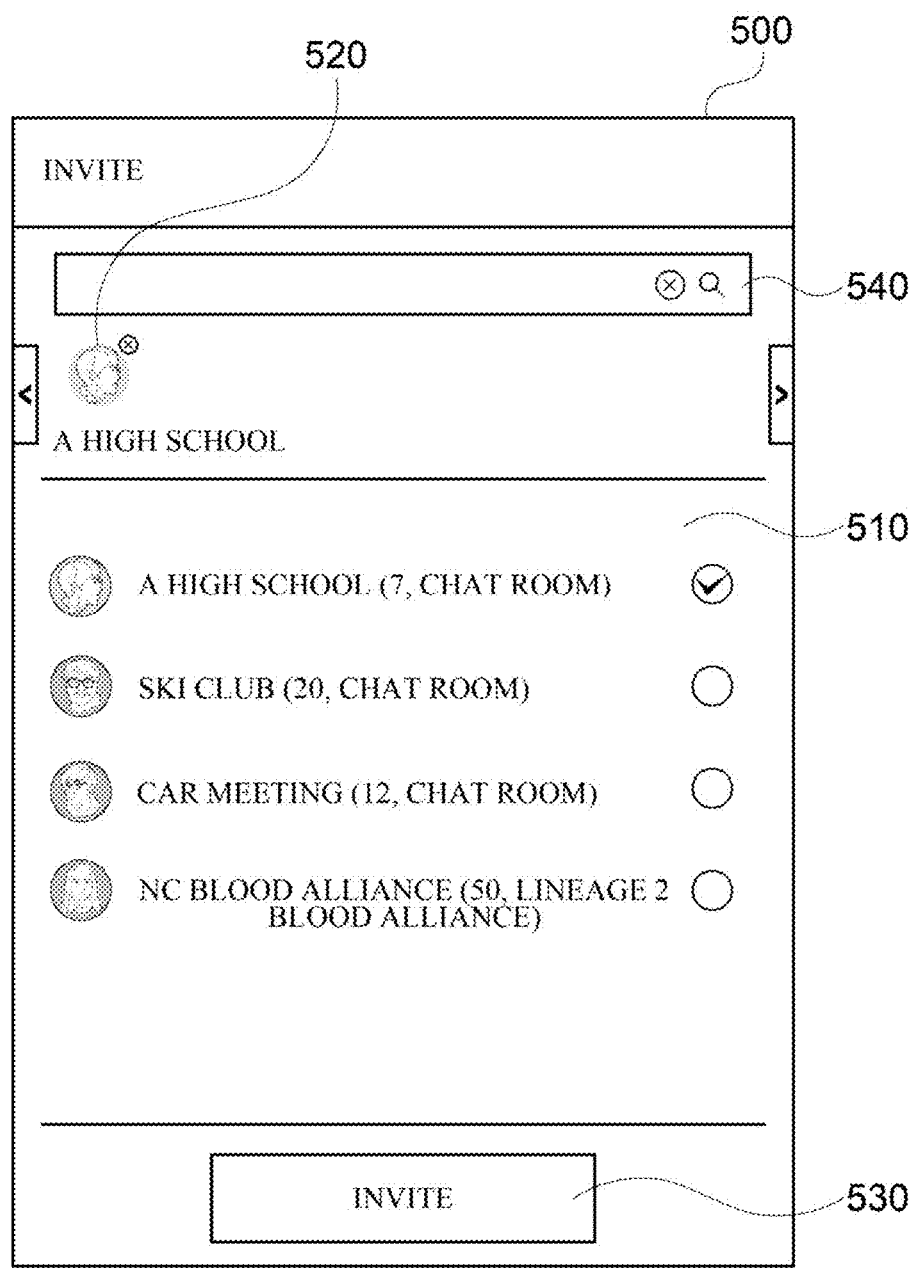
FIGS. 5 and 6 are diagrams illustrating examples of an invitation interface screen provided by a service application according to one embodiment.
Figure 6:
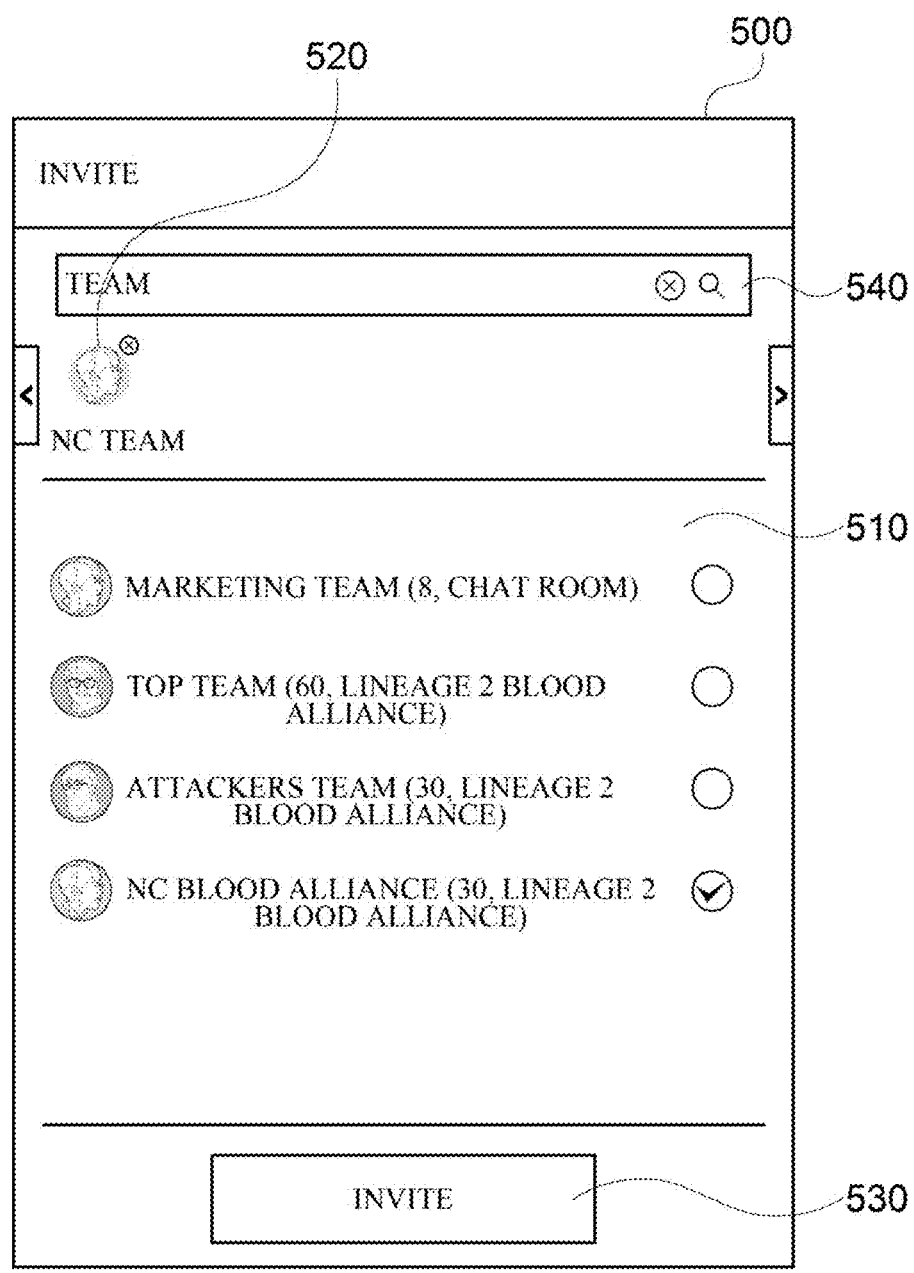

FIGS. 4 to 6 are diagrams for describing an example of providing a list of invitation targets in response to an invitation target information request according to one embodiment.

Specifically, a user of the chat service may create a new chat room or access a chat room in which the user is already participating by executing a user application installed on his/her user device. In this case, the user application may display, for example, a basic interface screen 400 of the chat room accessed by the user on a display screen of the user device, as shown in FIG. 4.

Specifically, FIG. 4 shows an example of a basic interface screen 400 of chat room "Room 1" displayed on a user device of a user with an user ID of "user 1" by a user application when the user with an user ID of "user 1" creates chat room "Room 1."

As illustrated in FIG. 4, the exemplary basic interface screen 400 may include a chat room name display area 410, a chat content display area 420 displaying messages exchanged between participants in the chat room, a message input window 430 displaying a message that a user is currently inputting, a participant list display area 440 displaying a list of chat room participants, a menu icon 450 for switching to an invitation interface screen, and the like.

Meanwhile, when the menu icon 450 displayed on the user basic interface screen 400 is selected, the user application may request invitation target information to the apparatus 200 for providing a chat service and may display an invitation interface screen 500 on a display screen of the user device of "user 1" as shown in the example shown in FIG. 5. At this time, the invitation interface screen 500 may include an invitation target list display area 510, an invitation target user group display area 520, an invitation button UI 530, and a search UI 540.

Meanwhile, when "user 1" does not input a search keyword to the search UI 540, the user application may receive a list of invitation targets including one or more user groups to which "user 1" is belonging from the apparatus 200 for providing a chat service, and may display the received list of invitation targets on the invitation target list display area 510.

Meanwhile, the list of invitation targets displayed on the invitation target list display area 510 may include a name of a user group, a representative image, the number of users belonging to a user group, and information on a type of a user group as shown in the illustrated example. Specifically, as shown in FIG. 5, the list of invitation targets includes four user groups each of which is named "A high school," "ski club," "car meeting," and "NC blood alliance." In addition, the number of users included in the user group and the type of the user group are displayed in parentheses to the right of the name of each user group. Specifically, each of numbers "7", 20", "12", and "50" displayed in parentheses indicates the number of users included in each user group. In addition, "chat room" displayed in parentheses indicates that the type of a user group is a chat room created in the chat service, and "Lineage 2 blood alliance" indicates a blood alliance registered in online game "Lineage 2" which is an associated service.

Meanwhile, referring to FIG. 6, when the user requests a search by entering a search keyword in a search box of the search UI 540, the user application may request a user group search based on the search keyword to the device 200 for providing a chat service. In this case, the list of invitation targets displayed on the invitation target list display area 510 may include one or more user groups matching the search keyword.

Specifically, when a user group search is requested by the user application, the apparatus 200 for providing a chat service may perform a search for a user group of the chat service using the search keyword. Also, the apparatus 200 for providing a chat service may request a search for a user group of the associated service by providing a search keyword, and receive a search is result for the user group of the associated service using the search keyword from the associated service system 130.

On the other hand, when a user group matching the search keyword is found from among the user groups of the chat service and the user groups of the associated service, the apparatus 200 for providing a chat service may provide a list of invitation targets including the found user group to the user application which has requested a search, and the user application may display the received list of invitation targets on the invitation target list display area 510.

Meanwhile, as shown in the examples shown in FIGS. 5 and 6, when the user selects one or more user groups as the invitation target user group from the list of invitation targets displayed on the invitation target list display area 510, the user application may display the selected invitation target user group on the invitation target user group display area 520. In addition, when a user input for the invitation button UI 530 is detected in a state in which one or more user groups are selected as the invitation target user group, the user application may request the apparatus 200 for providing a chat service to invite the selected invitation target user group.

Figure 7:
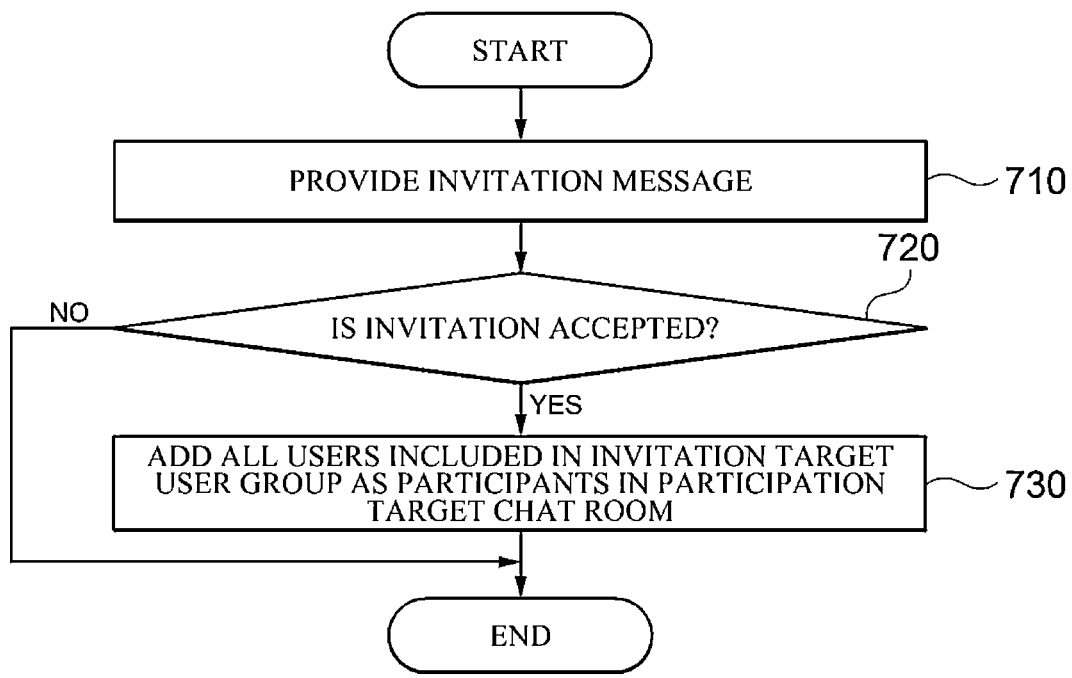
FIG. 7 is a flowchart illustrating invitation procedures for an invitation target user group according to one embodiment.

FIG. 7 is a flowchart illustrating invitation procedures for an invitation target user group according to one embodiment.

Referring to FIG. 7, when an invitation request for an invitation target user group is received from a user device of a participant in an invitation target chat room, the apparatus 200 for providing a chat service provides an invitation message for an invitation to the participation target chat room to one user device of one or more users included in the invitation target user group.

According to an embodiment, the apparatus 200 for providing a chat service may provide an invitation message for an invitation to a participation target chat room to a user device of a representative of the invitation target user group.

In this case, the representative of the invitation target user group may mean a user who has authority to determine whether to accept an invitation to the participation target chat room on behalf of all users included in the invitation target user group. For example, if the invitation target user group is a chat room created in the chat service, the representative of the invitation target user group may be a creator or host of the corresponding chat room. In another example, if the invitation target user group is a user group (e.g., blood alliance, guild, clan, or the like) registered in an online game service, which is an associated service, a representative of the invitation target user group may be a user (e.g., a guild master, a blood alliance lord, or the like) who operates or manages the corresponding user group. However, the representative of the invitation target group is not necessarily limited to the above-described examples, and may vary according to the type or form of the invitation target group.

Meanwhile, according to another embodiment, the apparatus 200 for providing a chat service may provide a message for inviting to the participation target chat room to a user device of a user selected by a participant (hereinafter referred to as an "inviter") who has been randomly selected from among one or more users included in the invitation target user group by the apparatus 200 for providing a chat service or has requested an invitation to the invitation target user group.

For example, if a representative does not exist in the invitation target user group, the apparatus 200 for providing a chat service may provide the invitation message for an invitation to the participation target chat room to a user device of a user who has been selected from among one or more users included in the invitation target user group by the inviter.

In another example, if a representative does not exist in the invitation target user group, the apparatus 200 for providing a chat service may randomly select one of one or more users is included in the invitation target user group, and may provide the invitation message for an invitation to the participation target chat room to a user device of the selected user.

On the other hand, after providing the invitation message, the apparatus 200 for providing a chat service determines whether the user who has received the invitation message has accepted the invitation to the participation target chat room (720).

According to one embodiment, when an invitation acceptance message is received from the user device of the user who has received the invitation message for an invitation to the participation target chat room, the apparatus 200 for providing a chat service may determine that the user who has received the invitation message has accepted the invitation to the participation target chat room.

In addition, according to one embodiment, the apparatus 200 for providing a chat service may determine that the user who has received the invitation message rejects the invitation to the participation target chat room when an invitation rejection message is received from the user device of the user who has received the invitation message for an invitation to the participation target chat room or when the invitation acceptance message is not received within a preset period of time.

On the other hand, when the user who has received the invitation message accepts the invitation to the participation target chat room, the apparatus 200 for providing a chat service may add all users included in the invitation target user group as participants in the participation target chat room (730).

In contrast, when the user who has received the invitation message rejects the invitation to the participation target chat room, the apparatus 200 for providing a chat service ends the invitation procedures for the invitation target user group.

Meanwhile, when the user who has received the invitation message rejects the invitation, is unlike the embodiment illustrated in FIG. 7, the apparatus 200 for providing a chat service may send an invitation message for an invitation to the participation target chat room to a user device of each of the remaining users included in the invitation target user group and then individually add a user who accepts the invitation as a user of the invitation target chat room according to an embodiment.

Meanwhile, in the flowchart illustrated in FIG. 7, at least some of the operations may be performed in different order or may be combined into fewer operations or further divided into more operations. In addition, some of the operations may be omitted, or one or more extra operations, which are not illustrated, may be added to the flowchart and be performed.

Figure 8:
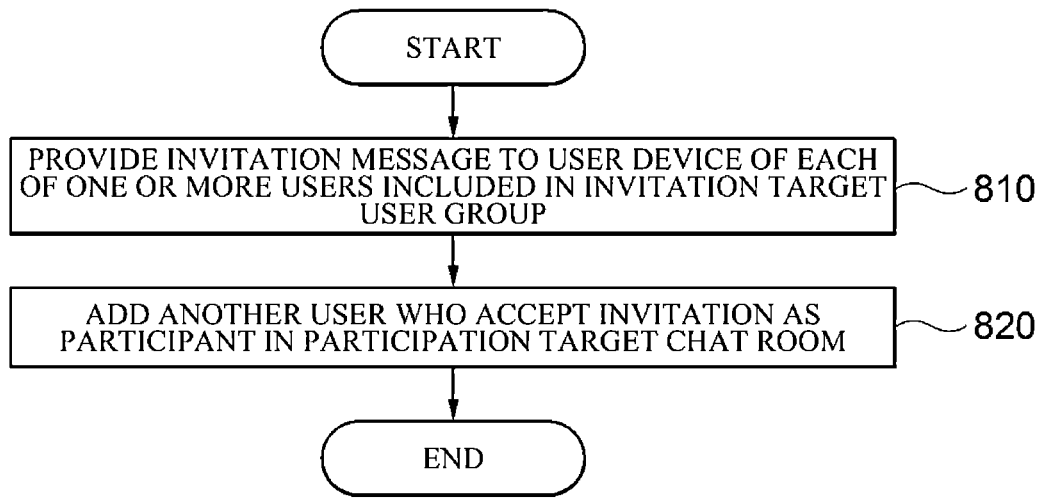
FIG. 8 is a flowchart illustrating invitation procedures for an invitation target user group according to another embodiment.

FIG. 8 is a flowchart illustrating invitation procedures for an invitation target user group according to another embodiment.

Referring to FIG. 8, when an invitation request for an invitation target user group is received from an inviter, the apparatus 200 for providing a chat service may transmit an invitation message for an invitation to a participation target chat room to a user device of each of one or more users included in the invitation target user group (810).

For example, when the inviter is included in the invitation target user group, the apparatus 200 for providing a chat service may transmit the invitation message for an invitation to the participation target chat room to a user device of each of the remaining users other than the inviter among the users included in the invitation target user group.

In another example, when the inviter is not included in the invitation target user group, the apparatus 200 for providing a chat service may transmit the invitation message for an invitation to the participation target chat room to a user device of each of all users included in the invitation target user group.

Thereafter, the apparatus 200 for providing a chat service adds a user who has accepted the invitation among the one or more users who have received the invitation message as a participant in the participation target chat room (820).

According to one embodiment, when an invitation acceptance message is received from the user device of the user who has received the invitation message, the apparatus 200 for providing a chat service may add the user as a participant in the participation target chat room.

In addition, according to one embodiment, when an invitation rejection message is received from the user device of the user who has received the invitation message or when the invitation acceptance message is not received within a preset period of time, the apparatus 200 for providing a chat service may determine that the corresponding user rejects the invitation to the participation target chat room, and then exclude the user from invitation targets.

Meanwhile, in the flowchart illustrated in FIG. 8, at least some of the operations may be performed in different order or may be combined into fewer operations or further divided into more operations. In addition, some of the operations may be omitted, or one or more extra operations, which are not illustrated, may be added to the flowchart and be performed.

Meanwhile, in the embodiments illustrated in FIGS. 7 and 8, it is described that the apparatus 200 for providing a chat service provides the invitation message to one or more users included in the invitation target user group, and then adds the one or more users included in the invitation target user group as participants in the participation target chat room according to whether the users have accepted an invitation. However, according an embodiment, when the inviter is included in the invitation target user group, the apparatus 200 for providing a chat service may add the remaining users other than the inviter among the users included in the invitation target user group as participants in the participation target chat room without sending is the invitation message, unlike the examples illustrated in FIGS. 7 and 8.

Figure 9:
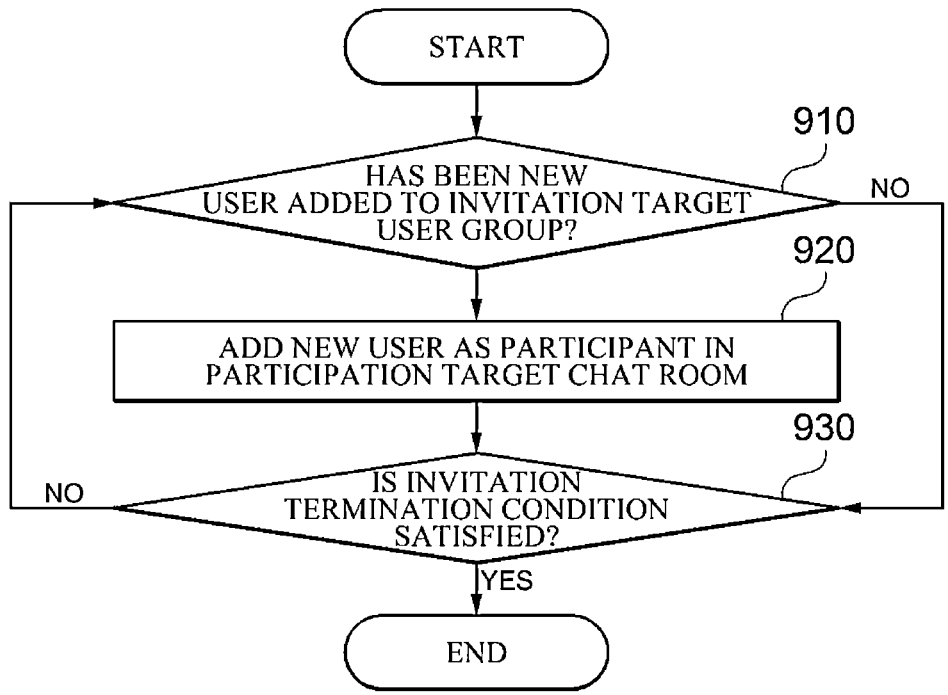
FIG. 9 is a flowchart illustrating invitation procedures for a new user added to an invitation target user group according to one embodiment.

FIG. 9 is a flowchart illustrating invitation procedures for a new user added to an invitation target user group according to an embodiment.

The procedures illustrated in FIG. 9 may be performed, for example, after all users included in the invitation target user group are added as participants in the participation target chat room according to the invitation procedures illustrated in FIG. 7.

Referring to FIG. 9, the apparatus 200 for providing a chat service determines whether a new user has been added to the invitation target user group (910).

At this time, when a new user has been added to the invitation target user group, the apparatus 200 for providing a chat service adds the added new user as a participant in the participation target chat room (920).

Then, the apparatus 200 for providing a chat service determines whether an invitation termination condition is satisfied for the invitation target user group (930), and if the invitation termination condition is not satisfied, the procedure returns to operation 910.

In this case, according to one embodiment, the invitation termination condition for the invitation target user group may be set by an inviter who has requested an invitation for the invitation target user group or may be preset by an operator of the chat service.

For example, the apparatus 200 for providing a chat service may determine that the invitation termination condition is satisfied when a period of time preset by the inviter or the operator of the chat service elapses.

In another example, the apparatus 200 for providing a chat service may determine that the invitation termination condition is satisfied when the invitation target user group or the is participation target chat room is disbanded.

Meanwhile, the invitation termination condition for the invitation target user group is not necessarily limited to the above-described examples, and may be variously set according to embodiments other than the above-described example.

Meanwhile, in the flowchart illustrated in FIG. 9, at least some of the operations may be performed in different order or may be combined into fewer operations or further divided into more operations. In addition, some of the operations may be omitted, or one or more extra operations, which are not illustrated, may be added to the flowchart and be performed.

Figure 10:
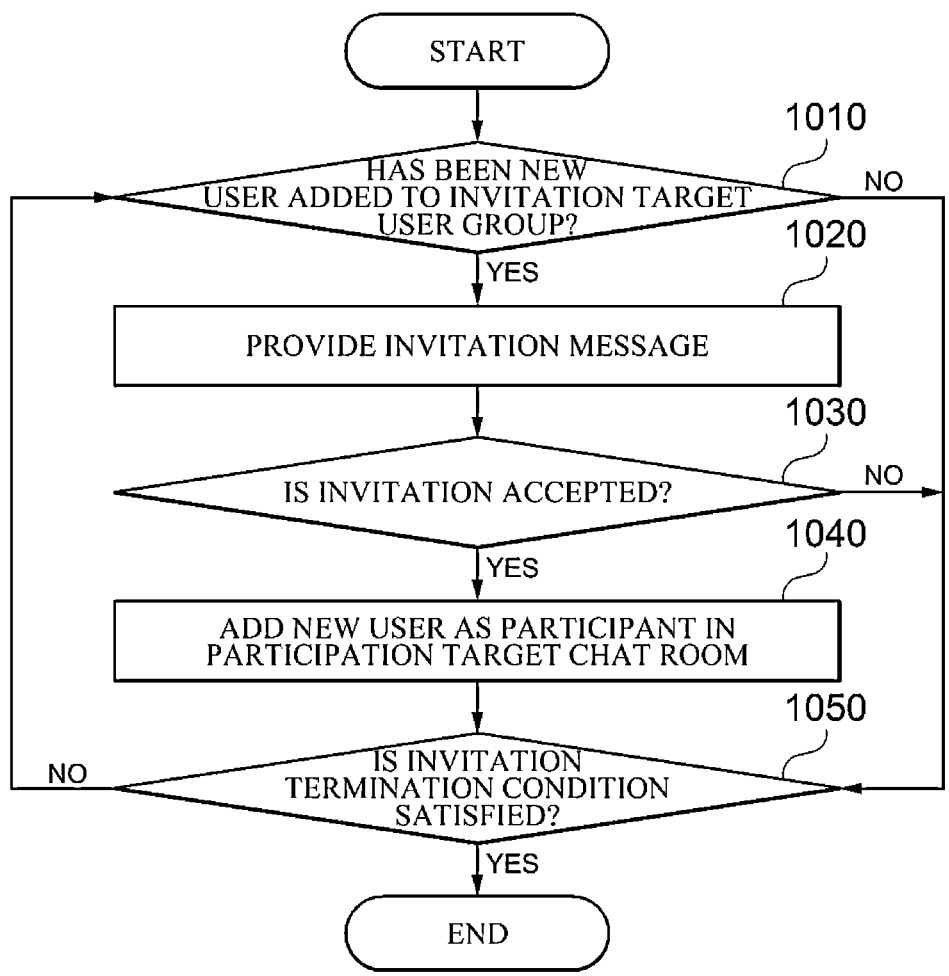
FIG. 10 is a flowchart illustrating invitation procedures for a new user added to an invitation target user group according to another embodiment.

FIG. 10 is a flowchart illustrating invitation procedures for a new user added to an invitation target user group according to another embodiment.

Specifically, the procedures illustrated in FIG. 10 may be performed after all users included in the invitation target user group are added as participants in the participation target chat room according to the invitation procedures illustrated in FIG. 7, or after an invitation message is provided to a user device of each of one or more users included in the invitation target user group according to the invitation procedures illustrated in FIG. 8.

Referring to FIG. 10, the apparatus 200 for providing a chat service determines whether a new user has been added to the invitation target user group (1010).

At this time, when a new user is added to the invitation target user group, the apparatus 200 for providing a chat service provides an invitation message for an invitation to the participation target chat room to a user device of the added new user (1020).

Thereafter, the apparatus 200 for providing a chat service determines whether or not the new user who has received the invitation message has accepted the invitation to the participation target chat room (1030).

In this case, according to one embodiment, when an invitation acceptance message is is received from the user device of the new user who has received the invitation message, the apparatus 200 for providing a chat service may determine that the new user has accepted the invitation to the participation target chat room.

In addition, according to one embodiment, when an invitation rejection message is received from the user device of the new user who has received the invitation message, or when a message regarding whether to accept the invitation is not received within a preset period of time, the apparatus 200 for providing a chat service may determine that the new user has rejected the invitation to the participation target chat room.

On the other hand, if the new user who has received the invitation message has accepted the invitation to the participation target chat room, the apparatus 200 for providing a chat service adds the new user as a participant in the participation target chat room (1040).

Then, the apparatus 200 for providing a chat service determines whether an invitation termination condition for the invitation target user group is satisfied (1050), and when the invitation termination condition is not satisfied, the procedure returns to operation 1010.

In this case, according to one embodiment, the invitation termination condition for the invitation target user group may be set by an inviter who has requested an invitation for the invitation target user group or may be preset by an operator of the chat service.

For example, the apparatus 200 for providing a chat service may determine that the invitation termination condition is satisfied when a period of time preset by the inviter or the operator of the chat service elapses.

In another example, the apparatus 200 for providing a chat service may determine that the invitation termination condition is satisfied when the invitation target user group or the is participation target chat room is disbanded.

Meanwhile, the invitation termination condition for the invitation target user group is not necessarily limited to the above-described examples, and may be variously set according to embodiments other than the above-described example.

Meanwhile, in the flowchart illustrated in FIG. 10, at least some of the operations may be performed in different order or may be combined into fewer operations or further divided into more operations. In addition, some of the operations may be omitted, or one or more extra operations, which are not illustrated, may be added to the flowchart and be performed.

Figure 11:
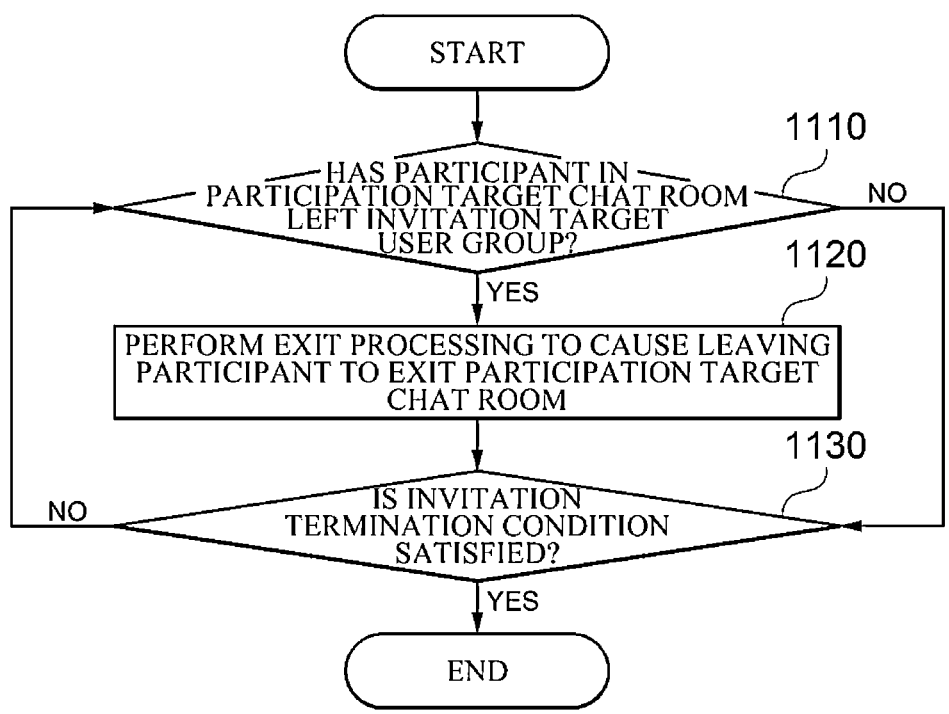
FIG. 11 is a flowchart illustrating exit processing procedures performed when a user included in an invitation target user group leaves the invitation target user group after joining a participation target chat room according to one embodiment.

FIG. 11 is a flowchart illustrating exit processing procedures performed when a user included in an invitation target user group leaves the invitation target user group after joining a participation target chat room according to one embodiment.

Referring to FIG. 11, the apparatus 200 for providing a chat service determines whether a participant in the participation target chat room has left the invitation target user group (1110).

When the participant in the participation target chat room leaves the invitation target user group, the apparatus 200 for providing a chat service processes invited user group leaves the invited user group, the chat service providing apparatus 200 exits the participant who has left the invitation target user group from the participation target chat room (1120).

Thereafter, the apparatus 200 for providing a chat service determines whether an invitation termination condition for the invitation target user group is satisfied (1130), and when the invitation termination condition is not satisfied, the procedure returns to operation 1110.

In this case, according to one embodiment, the invitation termination condition for the invitation target user group may be set by an inviter who has requested an invitation for the is invitation target user group or may be preset by an operator of the chat service.

For example, the apparatus 200 for providing a chat service may determine that the invitation termination condition is satisfied when a period of time preset by the inviter or the operator of the chat service elapses.

In another example, the apparatus 200 for providing a chat service may determine that the invitation termination condition is satisfied when the invitation target user group or the participation target chat room is disbanded.

Meanwhile, the invitation termination condition for the invitation target user group is not necessarily limited to the above-described examples, and may be variously set according to embodiments other than the above-described example.

Meanwhile, in the flowchart illustrated in FIG. 11, at least some of the operations may be performed in different order or may be combined into fewer operations or further divided into more operations. In addition, some of the operations may be omitted, or one or more extra operations, which are not illustrated, may be added to the flowchart and be performed.

Figure 12:
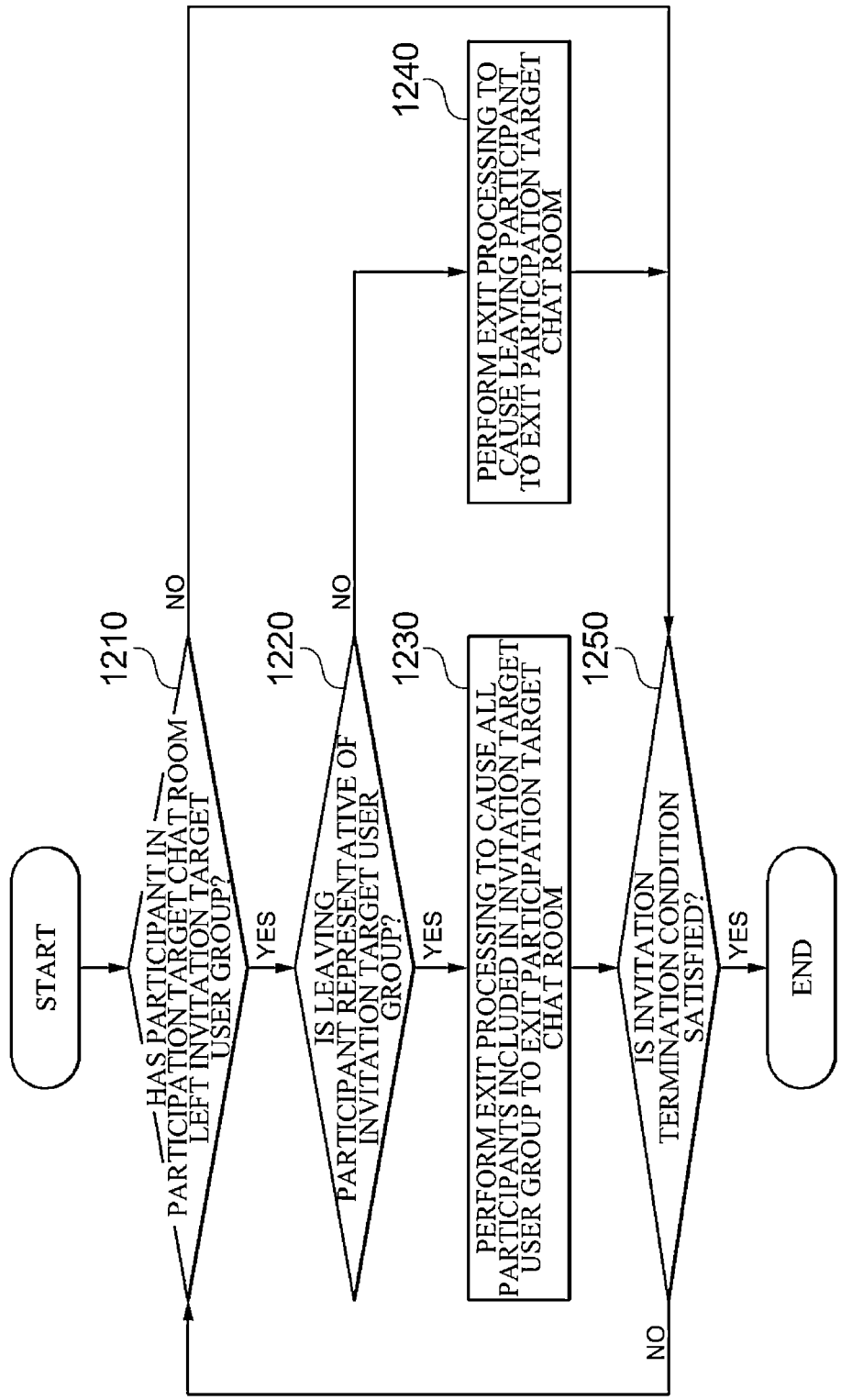
FIG. 12 is a flowchart illustrating exit processing procedures performed when a user included in an invitation target user group leaves the invitation target user group after joining a participation target chat room according to another embodiment.

FIG. 12 is a flowchart illustrating exit processing procedures performed when a user included in an invitation target user group leaves the invitation target user group after joining a participation target chat room according to another embodiment.

Referring to FIG. 12, the apparatus 200 for providing a chat service determines whether a participant in the participation target chat room has left the invitation target user group (1210).

When the participant in the participation target chat room has left the invitation target user group, the apparatus 200 for providing a chat service determines whether the leaving participant is a representative of the invitation target user group (1220).

In this case, when the participant who has left the invitation target user group is a representative of the invitation target user group, the apparatus 200 for providing a chat service is performs exit processing to cause all participants included in the invitation target user group who are participants in the participation target chat room to exit the participation target chat room (1230).

In contrast, when the participant who has left the invitation target user group is not a representative of the invitation target user group, the apparatus 200 for providing a chat service performs exit processing to cause the participant who has left the invitation target user group to exit the participation target chat room (1240).

Thereafter, the apparatus 200 for providing a chat service determines whether an invitation termination condition for the invitation target user group is satisfied (1250), and when the invitation termination condition is not satisfied, the procedure returns to operation 1210.

In this case, according to one embodiment, the invitation termination condition for the invitation target user group may be set by an inviter who has requested an invitation for the invitation target user group or may be preset by an operator of the chat service.

For example, the apparatus 200 for providing a chat service may determine that the invitation termination condition is satisfied when a period of time preset by the inviter or the operator of the chat service elapses.

In another example, the apparatus 200 for providing a chat service may determine that the invitation termination condition is satisfied when the invitation target user group or the participation target chat room is disbanded.

Meanwhile, the invitation termination condition for the invitation target user group is not necessarily limited to the above-described examples, and may be variously set according to embodiments other than the above-described example.

Meanwhile, in the flowchart illustrated in FIG. 12, at least some of the operations may be performed in different order or may be combined into fewer operations or further divided into is more operations. In addition, some of the operations may be omitted, or one or more extra operations, which are not illustrated, may be added to the flowchart and be performed.

Figure 13:
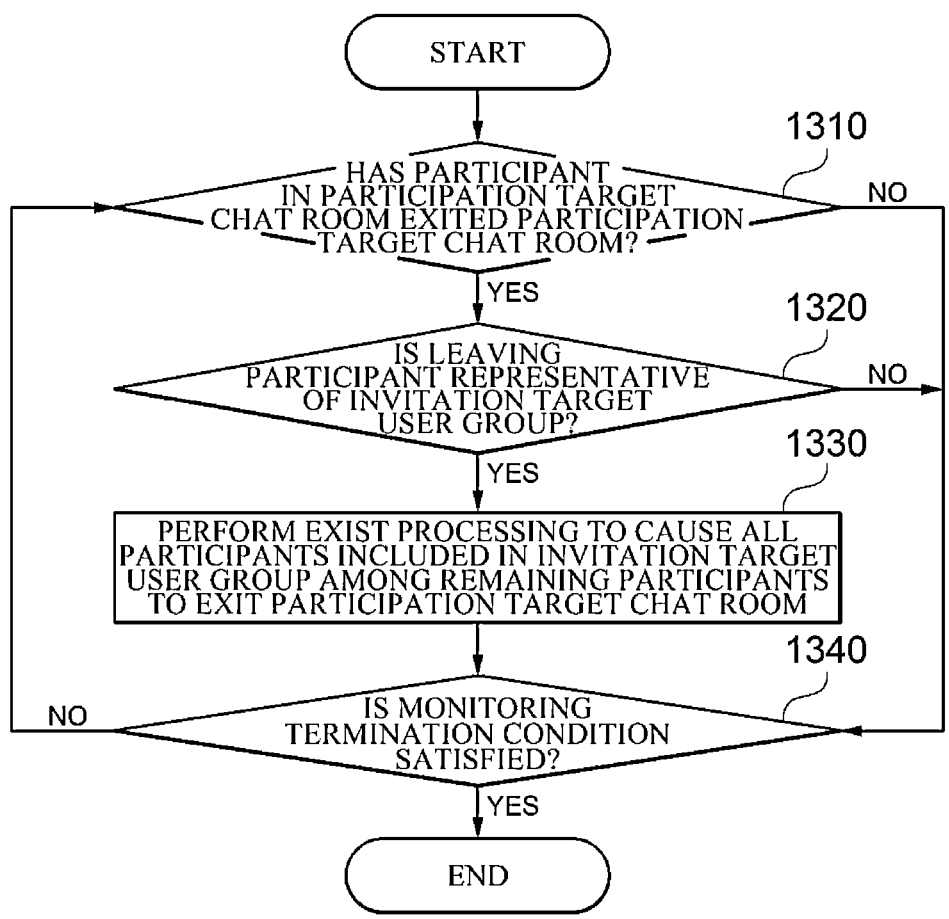
FIG. 13 is a flowchart illustrating procedures performed when a participant in a participation target chat room exits the participation target chat room according to one embodiment.

FIG. 13 is a flowchart illustrating procedures performed when a participant in a participation target chat room exits the participation target chat room according to one embodiment.

Referring to FIG. 13, when a participant in a participation target chat room exits the participation target chat room (1310), the apparatus 200 for providing a chat service determines whether the exiting participant is a representative of an invitation target user group (1320).

At this time, when the exiting participant is a representative of the invitation target user group, the apparatus 200 for providing a chat service performs exit processing to cause all participants included in the invitation target user group among the remaining participants in the participation target chat room to exit the chat room (1330).

Thereafter, the apparatus 200 for providing a chat service determines whether a monitoring termination condition for the participation target chat room is satisfied (1340), and when the monitoring termination condition is not satisfied, the procedure returns to operation 1310.

In this case, according to one embodiment, the apparatus 200 for providing a chat service may determine that the monitoring termination condition is satisfied when the participation target chat room is disbanded or when all participants included in the invitation target user group exit the participation target chat room. However, the monitoring termination condition for the participation target chat room is not necessarily limited to the above-described examples, and may be various set according to an embodiment.

Meanwhile, in the flowchart illustrated in FIG. 13, at least some of the operations may be performed in different order or may be combined into fewer operations or further divided into is more operations. In addition, some of the operations may be omitted, or one or more extra operations, which are not illustrated, may be added to the flowchart and be performed.

Figure 14:
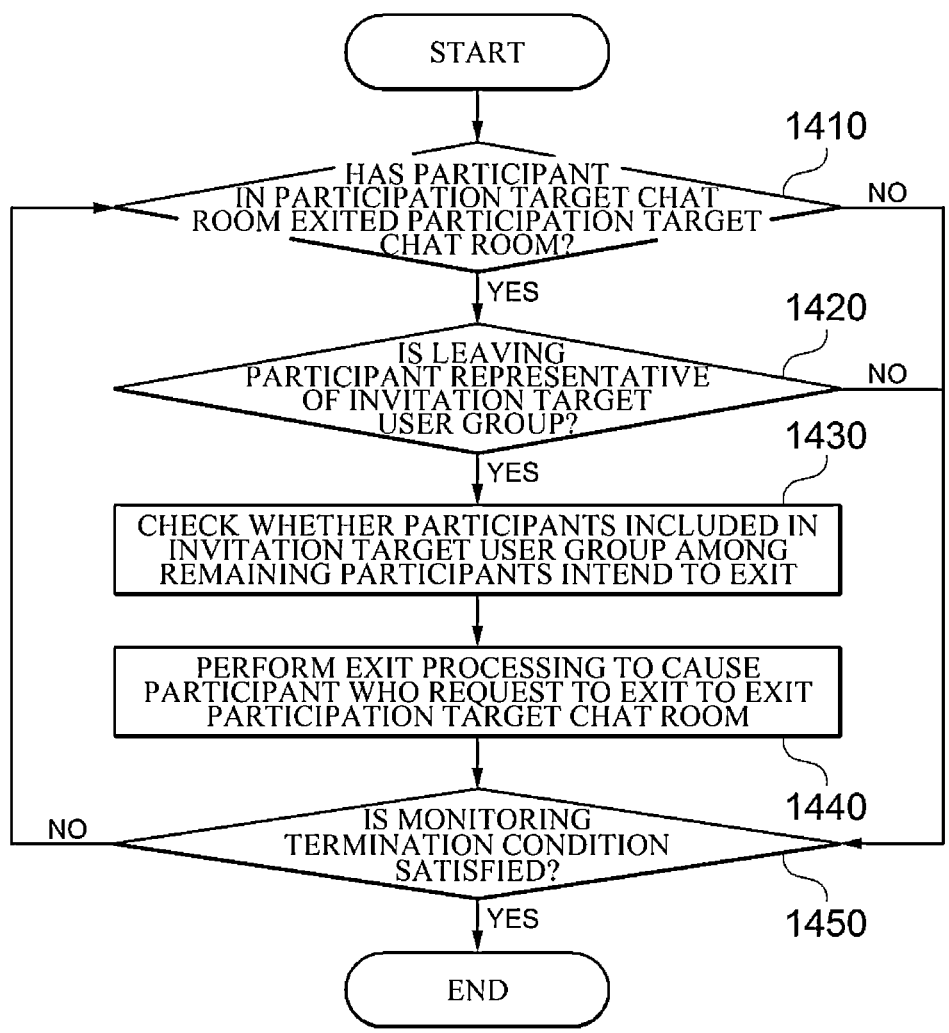
FIG. 14 is a flowchart illustrating procedures performed when a participant in a participation target chat room exits the participation target chat room according to another embodiment.

FIG. 14 is a flowchart illustrating procedures performed when a participant in a participation target chat room exits the participation target chat room according to another embodiment.

Referring to FIG. 14, when a participant in the participation target chat room exits the participation target chat room (1410), the apparatus 200 for providing a chat service determines whether the exiting participant is a representative of an invitation target user group (1420).

At this time, when the exiting participant is a representative of the invitation target user group, the apparatus 200 for providing a chat service checks whether each participant included in the invitation target user group among the remaining participants in the participation target chat room intends to exit the participation target chat room (1430).

Thereafter, the apparatus 200 for providing a chat service performs exit processing to cause the participants who request to exit the participation target chat room among the participants included in the invitation target user group to exit the participation target chat room (1440).

For example, the apparatus 200 for providing a chat service may provide a query message to query the intention to exit the participation target chat room to a user device of each participant included in the invitation target user group among the remaining participants in the participation target chat room. In this case, the apparatus 200 for providing a chat service may, when receiving an exit request message from a user device of a participant who has received the inquiry message, cause the corresponding participant to exit the participation target chat room.

Thereafter, the apparatus 200 for providing a chat service determines whether a monitoring termination condition for the participation target chat room is satisfied (1450), and is when the monitoring termination condition is not satisfied, the procedure returns to operation 1410.

In this case, according to one embodiment, the apparatus 200 for providing a chat service may determine that the monitoring termination condition is satisfied when the participation target chat room is disbanded or when all participants included in the invitation target user group exit the participation target chat room. However, the monitoring termination condition for the participation target chat room is not necessarily limited to the above-described examples, and may be variously set according to an embodiment.

Meanwhile, in the flowchart illustrated in FIG. 13, at least some of the operations may be performed in different order or may be combined into fewer operations or further divided into more operations. In addition, some of the operations may be omitted, or one or more extra operations, which are not illustrated, may be added to the flowchart and be performed.

Figure 15:
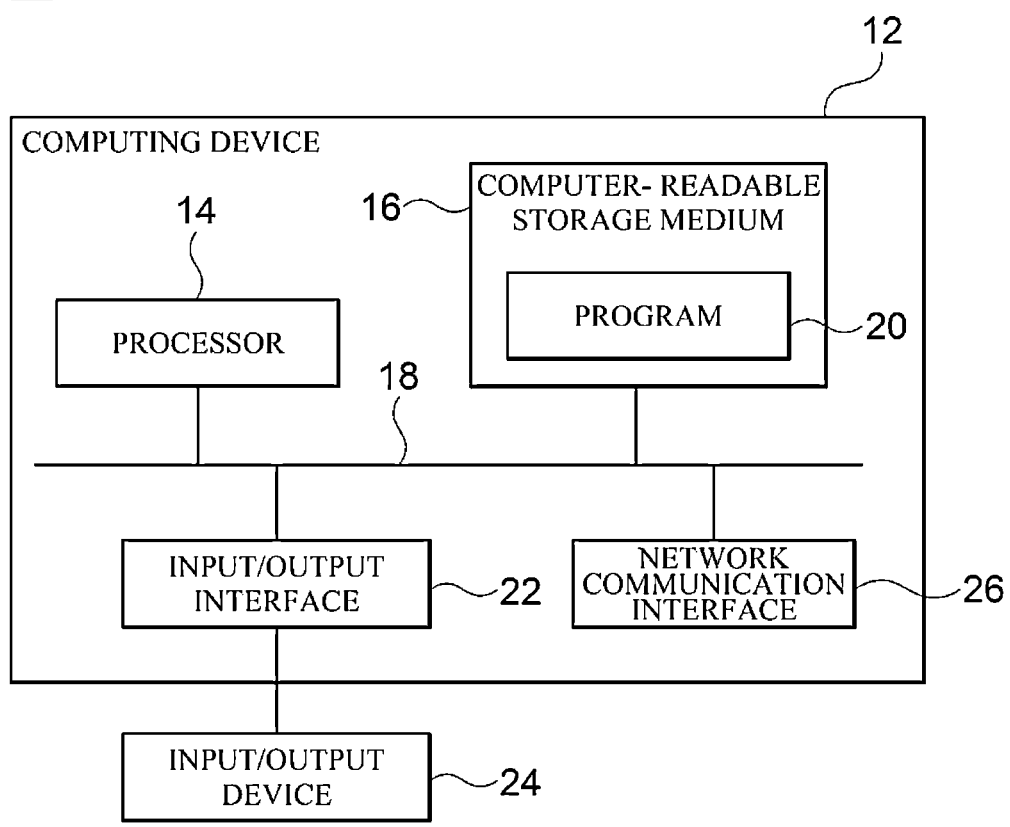
FIG. 15 is a block diagram for describing an example of a computing environment including a computing device according to one embodiment.

FIG. 15 is a block diagram for describing an example of a computing environment including a computing device according to one embodiment.

In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the apparatus 200 for providing a chat service illustrated in FIG. 2.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage is medium 16. The one or more programs may include one or more computer executable commands, and the computer executable commands may be configured to, when executed by the processor 14, cause the computing device 12 to perform operations according to the exemplary embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be is included inside the computing device 12 or may be configured as a separate device from the computing device 12 and connected to the computing device 12.

According to the disclosed embodiments, a list of user groups that can be invited to a chat room is provided to a user who participates in the chat room and a user group selected by the user from the provided list is invited, and hence the user's convenience may be increased when a plurality of other users are intended to be invited to the chat room.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing a service, comprising:
providing, via a user interface screen, an invitation target list including a plurality of user groups to a user device of a user participating in a chat room;
receiving, from the user device, an invitation request for one or more user groups each selected as an invitation target user group from among the plurality of user groups;
providing an invitation message for an invitation to the chat room to a user device of at least one of one or more users included in the invitation target user group; and
adding the at least one of the one or more users included in the invitation target user group as a participant in the chat room according to whether a user who has received the invitation message accepts the invitation,
wherein the providing of the invitation message comprises, based on the invitation target user group not including a representative who has authority to determine whether to accept the invitation to the chat room, providing the invitation message to a user device of a user who is selected by an apparatus for providing a chat service from among all users included in the invitation target user group, and
wherein the adding comprises, when the selected user accepts the invitation to the chat room, adding the all users included in the invitation target user group as participants in the chat room.

2. The method of claim 1, further comprising:
based on determining that the selected user refuses to accept the invitation to the chat room, sending the invitation to the chat room to a user device of each of remaining users included in the invitation target user group, and individually adding a user who accepts the invitation, among the remaining users, as the participant in the chat room.

3. The method of claim 1, further comprising:
based on determining that a user who, among the one or more users included in the invitation target user group, was added as the participant in the chat room leaves the invitation target user group and is no longer included in the invitation target user group, performing exit processing to cause the leaving user to exit the chat room.

4. The method of claim 3, wherein the performing of the exit processing comprises, when the invitation target user group includes the representative and the leaving user is the representative of the invitation target user group, performing exit processing to cause the all users included in the invitation target user group among the one or more users participating in the chat room to exit the chat room.

5. The method of claim 1, wherein the plurality of user groups include at least one of a user group of a chat service in which the chat room is created and a user group of an associated service of the chat service, the user group of the chat service includes at least one of other chat rooms created in the chat service and user groups pre-registered by the user in the chat service, and the associated service includes an online game service.

6. The method of claim 1, wherein the providing of the invitation message comprises, based on the invitation target user group including the representative, providing the invitation message to a user device of the representative of the invitation target user group, and
wherein the adding comprises, when the representative accepts the invitation to the chat room, adding the all users included in the invitation target user group as participants in the chat room.

7. The method of claim 1, wherein the providing of the invitation message comprises, based on the invitation target user group not including the representative, providing the invitation message to a user device of a user who is randomly selected from among the one or more users included in the invitation target user group or who is selected by a user who has requested the invitation for the invitation target user group.

8. The method of claim 1, wherein the transmitting of the invitation message comprises providing the invitation message to a user device of each of the one or more users included in the invitation target user group, and
wherein the adding comprises adding a user who accepts the invitation to the chat room among the one or more users included in the invitation target user group as the participant in the chat room.

9. The method of claim 1, further comprising:
when a new user is added to the invitation target user group after the adding of the at least one of the one or more users, providing the invitation message to the chat room to a user device of the new user; and
when the new user accepts the invitation to the chat room, adding the new user as the participant in the chat room.

10. The method of claim 1, further comprising, when the invitation target user group includes the representative and the representative of the invitation target user group exits the chat room after being added as the participant in the chat room, performing exit processing to cause all users included in the invitation target user group among remaining users participating in the chat room to exit the chat room.

11. An apparatus for providing a chat service, comprising:
one or more processors; and
one or more communication interfaces,
wherein the one or more processors are configured to:
provide, through the one or more communication interfaces, an invitation target list including a plurality of user groups to a user device of a user participating in a chat room to be displayed on a user interface screen of the user device;
receive, through the one or more communication interfaces, an invitation request for one or more user groups each selected as an invitation target user group from among the plurality of user groups from the user device;
provide an invitation message for an invitation to the chat room to a user device of at least one of one or more users included in the invitation target user group; and
add the at least one of the one or more users included in the invitation target user group as a participant in the chat room according to whether the user who has received the invitation message accepts the invitation,
wherein the one or more processors are further configured to:
based on the invitation target user group not including a representative who has authority to determine whether to accept the invitation to the chat room, provide the invitation message to a user device of a user who is selected from among all users included in the invitation target user group; and based on the selected user accepting the invitation to the chat room, add the all users included in the invitation target user group as participants in the chat room.

12. The apparatus of claim 11, wherein the plurality of user groups include at least one of a user group of a chat service in which the chat room is created and a user group of an associated service of the chat service, the user group of the chat service includes at least one of other chat rooms created in the chat service and user groups pre-registered by the user in the chat service, and the associated service includes an online game service.

13. The apparatus of claim 11, wherein the one or more processors are further configured to:

provide the invitation message to a user device of the representative of the invitation target user group, and when the representative accepts the invitation to the chat room, add the all users included in the invitation target user group as participants in the chat room.

14. The apparatus of claim 11, wherein the one or more processors are further configured to: based on the invitation target user group not including the representative, provide the invitation message to a user device of a user who is randomly selected from among the one or more users included in the invitation target user group or who is selected by a user who has requested the invitation for the invitation target user group.

15. The apparatus of claim 11, wherein the one or more processors are further configured to:

provide the invitation message to a user device of each of the one or more users included in the invitation target user group, and add a user who accepts the invitation to the chat room among the one or more users included in the invitation target user group as the participant in the chat room.

16. The apparatus of claim 11, wherein the one or more processors are further configured to:

when a new user is added to the invitation target user group after adding the at least one of the one or more users included in the invitation target user group as the participant in the chat room, provide the invitation message to the chat room to a user device of the new user, and when the new user accepts the invitation to the chat room, add the new user as the participant in the chat room.

17. The apparatus of claim 11, wherein the one or more processors are further configured to, the invitation target user group includes the representative and the representative of the invitation target user group exits the chat room after being added as the participant in the chat room, perform exit processing to cause all users included in the invitation target user group among remaining users participating in the chat room to exit the chat room.

18. The apparatus of claim 11, wherein the one or more processors are further configured to, based on determining that a user who, among the one or more users included in the invitation target user group, was added as the participant in the chat room leaves the invitation target user group and is no longer included in the invitation target user group, perform exit processing to cause the leaving user to exit the chat room.

19. The apparatus of claim 18, wherein the one or more processors are further configured to, when the invitation target user group includes the representative and the leaving user is the representative of the invitation target user group, perform the exit processing to cause the all users included in the invitation target user group among the one or more users participating in the chat room to exit the chat room.

\* \* \* \* \*